United States Patent
Simonin et al.

(10) Patent No.: US 10,324,103 B2
(45) Date of Patent: Jun. 18, 2019

(54) IMPULSE RING AND A SENSOR-BEARING UNIT COMPRISING SUCH IMPULSE RING

(71) Applicant: Aktiebolaget SKF, Gothenburg (SE)

(72) Inventors: Anthony Simonin, Tours (FR); Vincent Sausset, Azay-le-Rideau (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/644,219

(22) Filed: Jul. 7, 2017

(65) Prior Publication Data

US 2018/0024157 A1 Jan. 25, 2018

(30) Foreign Application Priority Data

Jul. 21, 2016 (DE) .................. 10 2016 213 355

(51) Int. Cl.
*G01P 3/44* (2006.01)
*F16C 19/16* (2006.01)
*F16C 41/00* (2006.01)

(52) U.S. Cl.
CPC ............ *G01P 3/443* (2013.01); *F16C 19/16* (2013.01); *F16C 41/007* (2013.01); *F16C 2233/00* (2013.01)

(58) Field of Classification Search
CPC .... F16C 41/007; F16C 19/16; F16C 2361/63; F16C 2233/00; G01P 3/443
See application file for complete search history.

(56) References Cited

U.S. PATENT DOCUMENTS

| | | | | |
|---|---|---|---|---|
| 4,667,156 A | * | 5/1987 | Machino | B60B 27/0005 324/173 |
| 4,783,180 A | * | 11/1988 | Hayashi | B60B 27/00 324/173 |
| 2013/0094976 A1 | * | 4/2013 | Murakami | F04D 13/02 417/313 |
| 2015/0204385 A1 | * | 7/2015 | Sausset | F16C 41/007 384/448 |

FOREIGN PATENT DOCUMENTS

JP    2006296195 A  * 10/2006 ............. G01P 3/487
WO   WO-2014006436 A1 *  1/2014

OTHER PUBLICATIONS

Machine Translation of JP 2006-296195 (Year: 2006).*

* cited by examiner

*Primary Examiner* — Alan B Waits
(74) *Attorney, Agent, or Firm* — Bryan Peckjian; SKF USA Inc. Patent Dept.

(57) ABSTRACT

An impulse ring centered on a central axis, for a sensor-bearing unit including a bearing is provided. The impulse ring includes a magnetized target that generates a magnetic fields adapted to be sensed by a sensor, and an annular target holder. The target holder provides an inner axial tubular portion adapted to be fixed to a rotatable inner ring of the bearing, an outer axial tubular portion holding the magnetized target that is positioned radially beyond an outer ring of bearing, and an intermediate portion that radially extends between the inner axial tubular portion and outer axial tubular portion. The intermediate portion provides a radial part, an inclined part and a plurality of stiffening ribs.

4 Claims, 2 Drawing Sheets

IMPULSE RING AND A SENSOR-BEARING UNIT COMPRISING SUCH IMPULSE RING

CROSS REFERENCE TO RELATED APPLICATIONS

This application claims priority to German patent application no. 102016213355.1 filed on Jul. 21, 2016, the contents of which are fully incorporated herein by reference.

FIELD OF THE INVENTION

The invention concerns an impulse ring used in, for example, a rotation detecting device for detecting the rotational speed of elements rotatable relative to each other. The invention also concerns a sensor-bearing unit comprising a bearing and an impulse ring and used in, for example, automotive industry, aeronautics and other technical fields.

BACKGROUND OF THE INVENTION

Today, sensor-bearing units are commonly used in a wide range of technical fields, for example in automotive industry and aeronautics. These units provide high quality signals and transmissions, while allowing integration in simpler and more compact apparatus.

Such a sensor-bearing unit generally provides a bearing, an impulse ring, typically a magnetic impulse ring, and detection means facing the impulse ring. The impulse ring provides a target holder and a magnetized target including alternating North and South poles, whose number depends on bearing size, detection precision and particular application. With a bearing having suitable dimensions, the target holder may be fixed to a rotating ring of this bearing, while the detection means may be fixed to a non-rotating ring of this bearing or to a fixed casing.

The magnetized target is made from a magnetized material and is attached to a tubular portion of the target holder. Such a design is known from FR-A-2 884 367, in which the target holder provides an inner portion, which is attached to the inner ring of a bearing, a radial portion, and an outer tubular portion, which holds the magnetic target. The radial portion and the outer tubular portion form a right angle, which can be damaged in case of high rotation speeds, for example above 20 000 rotations per minute (rpm) and vibrations during operation of the impulse ring. In addition, the radial portion of the target holder provides a portion axially offset to avoid interferences with outer ring, but the specific shape increases the necessary space to integrate the sensor-bearing unit.

BRIEF SUMMARY OF THE INVENTION

The aim of the invention is to provide an impulse ring which has a target holder which better undergoes high rotation speeds and vibrations, and is of compact design to be integrated with a sensor-bearing unit in a reduced space.

To this end, the invention concerns an impulse ring centered on a central axis, for a sensor-bearing unit including a bearing. The impulse ring provides a magnetized target which generates a magnetic fields adapted to be sensed by detection means, and an annular target holder comprising an inner fixing portion adapted to be fixed to a rotatable inner ring of bearing, an outer axial tubular portion centered on the central axis and holding the magnetized target and which is radially beyond an outer ring of bearing, and an intermediate portion which substantially radially extends between the inner fixing portion and outer axial tubular portion.

According to the invention, the intermediate portion includes a radial part outwardly extending from the inner fixing portion along a radial plan which forms substantially a right angle with the central axis. The intermediate portion further includes an inclined part outwardly extending between the radial part and outer axial tubular portion along a frustoconical plan which is inclined with respect to the radial plan and is directed towards the outer ring of bearing. The intermediate portion further includes a plurality of circumferentially spaced stiffening ribs, the ribs axially protruding and radially elongating from the radial part towards the inclined part.

Thanks to the invention, the mechanical resistance of the target holder at high rotation speeds is improved. The inclination of the inclined part with respect to the radial part, and the ribs form rigidifying means for the target holder.

The inclined part is easy to manufacture, for example by deformation of radial intermediate portion, and reduce the deformation of the target holder from inertial force at high rotation speeds.

The outer axial tubular portion is centered on the central axis while the inclined part is inclined with respect to the central axis, hence with respect to the outer axial tubular portion. The edge at the intersection between the outer axial portion and inclined part does not form a right angle and thus improve the mechanical resistance of target holder at the intersection.

Moreover, the inclined part is inclined towards the bearing, and not outside of sensor-bearing device. The available space to receive such an impulse ring is reduced.

Stiffening ribs are easy to manufacture, for example by axially stamping the intermediate portion, and prevent any relative deformation between the two parts of the intermediate portion.

Advantageously, the inner fixing portion is an axial tubular portion centered on the central axis, the radial part outwardly and perpendicularly extending from the inner axial tubular portion.

According to one embodiment of the invention, the ribs are axially protruding towards the bearing. Alternatively, the ribs are axially protruding towards an opposite direction to the bearing.

According to one embodiment of the invention, the ribs are circumferentially equally spaced around the central axis.

According to another embodiment of the invention, the magnetized target is a plastic molded part.

Advantageously, the inclined part along the frustoconical plan makes an angle with respect to the central axis of the impulse ring which is provided between 60° and 90°, preferably equal to 75°.

The invention also concerns a sensor-bearing unit comprising a bearing including a rotatable inner ring and a stationary outer ring centered on the central axis, and an impulse ring as described here-above. The inner axial portion of the target holder of the impulse ring is secured in an inner bore of the inner ring, and the outer axial portion of the target holder is radially beyond an outer cylindrical surface of the outer ring. The radial part of the intermediate portion of the target holder is axially offset with respect to the inner ring of bearing.

Thanks to the invention, a radial gap is defined by the spacer between the inner ring, hence the bearing, and the intermediate portion of the target holder. The target holder does not interfere with the stationary outer ring during rotation of the holder.

The target holder provides rigidifying portions of the target holder and then is prevented from any deformation towards the stationary outer ring. The axial gap between outer ring and target holder can be set at minimum distance and the inclined part can be set with a reduced clearance to the outer ring.

According to one embodiment of the invention, the sensor-bearing unit further provides a spacer of substantially annular shaped and axially interposed between the inner ring and the radial part of the intermediate portion.

The spacer is formed integral with the inner ring. Alternatively, the spacer is a distinct element from the inner ring.

BRIEF DESCRIPTION OF THE SEVERAL VIEWS OF THE DRAWING

The invention will now be explained in correspondence with the annexed figures, and as an illustrative example, without restricting the object of the invention. In the annexed figures.

DETAILED DESCRIPTION OF THE INVENTION

Figure 1:
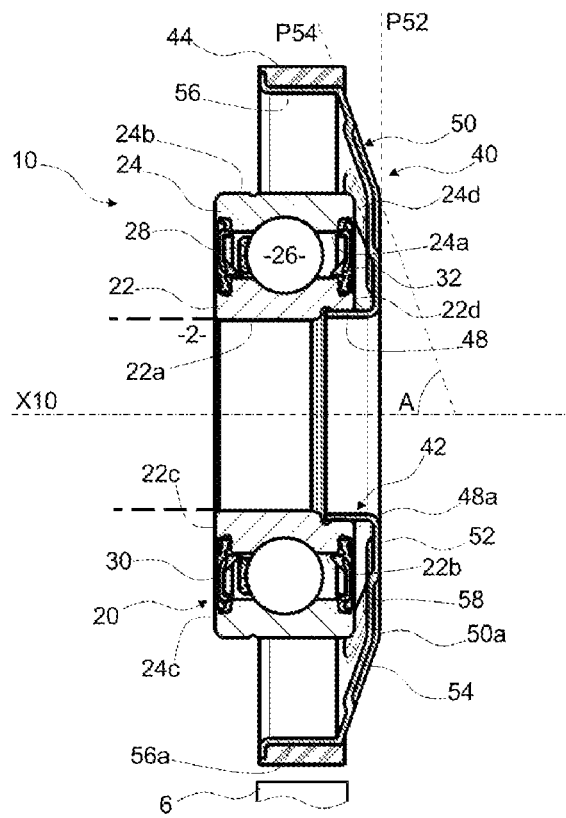
FIG. 1 is an axial sectional view of a sensor-bearing unit equipped with an impulse ring according to a first embodiment of the invention.

The sensor-bearing unit 10 according to the invention illustrated in FIG. 1 is adapted to equip an apparatus such a motor, a brake system, a suspension system or any rotating machine, in particular for an automotive vehicle.

Sensor-bearing unit 10 is centered in a central axis X10. Unit 10 provides a bearing 20 including a rotatable inner ring 22 and a stationary outer ring 24. Inner ring 22 rotates with respect to outer ring 24 around the central axis X10. Inner ring 22 provides an inner bore 22a, an outer cylindrical surface 22b and two annular lateral surfaces 22c and 22d. Inner ring 22 is fixed on a rotating shaft 2, which is fitted into bore 22a. Outer ring 24 provides an inner bore 24a, an outer cylindrical surface 24b and two annular lateral surfaces 24c and 24d.

In this embodiment, bearing 20 also provides a plurality of rolling elements 26, here balls, radially located between the outer surface 22b of inner ring 22 and the inner bore 24a of outer ring 24. Balls are maintained by a cage 28. Alternatively, rollers or needles can be used as rolling elements for bearing 20. Alternatively, bearing 20 can be a sliding bearing with no rolling elements.

Bearing 20 further provides sealing means 30, 32 on each axial side and located between the outer surface 22b of inner ring 22 and the inner bore 24a of outer ring 24. The row of balls 26 is axially arranged between the sealing means 30, 32. In this embodiment, sealing means 30, 32 are rubber seals fixed to outer ring 24 and in sliding contact with inner ring 22. As an alternative, bearing 20 may provide no sealing means. As another alternative, only one side of the bearing 20 may provide sealing means 30 or 32.

Figure 2:
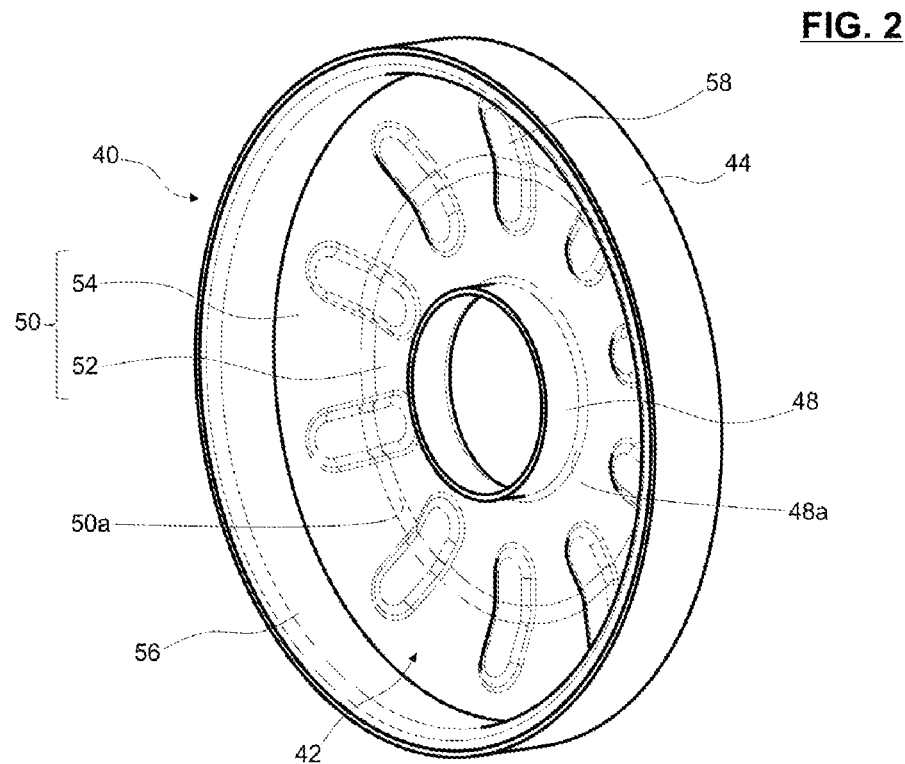
FIG. 2 is perspective front view of the impulse ring.
Figure 3:
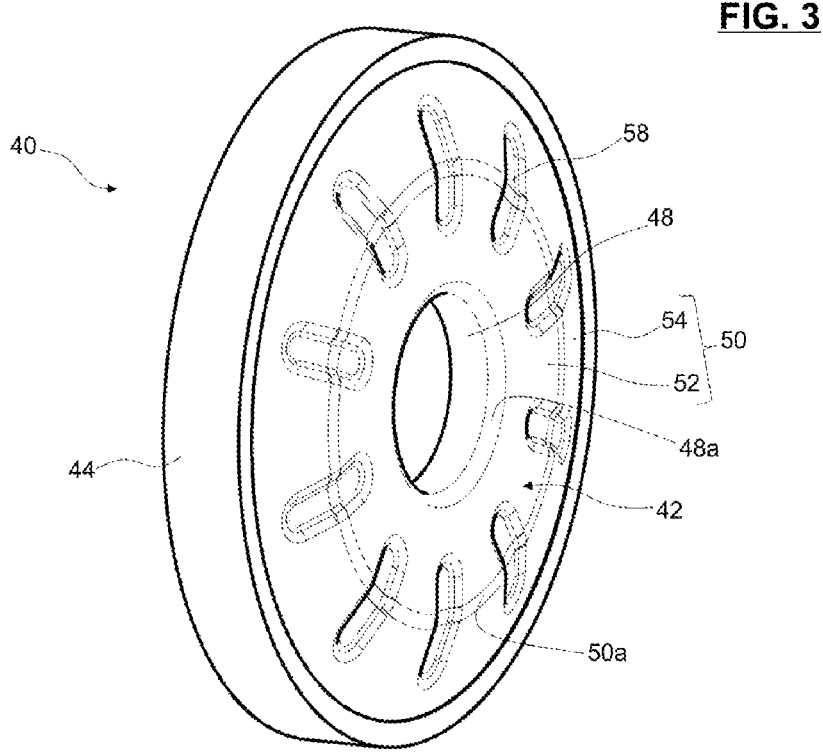
FIG. 3 is a perspective back view of the impulse ring.

Sensor-bearing unit 10 also includes an impulse ring 40 mounted on inner ring 22, and which provides a target holder 42 and a magnetized target 44. Target holder 42 is fixed to inner ring 22 and extends beyond outer ring 24 radially to central axis X10. The impulse ring 40 is further detailed in FIGS. 2 and 3.

Target holder 42 may be made of metal or plastic, formed by stamping or by any other suitable process. Going away from central axis X10, target holder 42 provides an inner axial tubular portion 48, an intermediate portion 50 with a radial part 52 at the smaller diameter and an inclined part 54 at the higher diameter, and an outer axial tubular portion 56. Inner axial tubular portion 48 and outer axial tubular portion 56 extend parallel to central axis X10, while intermediate portion 50 extend substantially radially to axis X10.

Inner axial tubular portion 48 is fitted in bore 22a of inner ring 22 to fasten in rotation the impulse ring 40 with the rotatable inner ring 22. The inner axial tubular portion 48 is not entirely inserted in bore 22a, an axial edge 48a of the portion 48 being axially offset with respect to the lateral surface 22d of inner ring 22. An axial gap is then defined between the lateral surface 22d and the radial part 52 that outwardly extends from the edge 48a of inner axial tubular portion 48 along a radial plan P52 which forms a right angle with the central axis X10 According to an alternate not shown, an annular spacer is axially interposed between the radial part 52 and lateral surface 22d of inner ring 22 to set the axial gap. The spacer may be formed integral with the inner ring or may be a distinct element from the inner ring.

The radial part 52 extends radially along the plan P52 and is outwardly extended by an inclined part 54 along a frustoconical plan P54 which is inclined with respect to the radial plan P52 and is directed towards the outer ring 24 of bearing 20. The inclined part 54 along the frustoconical plan P54 makes an angle A with respect to the central axis X1 of the impulse ring 40 which is equal to 75° in this embodiment. The inclined part extends radially beyond the outer cylindrical surface 24b of the outer ring 24. The inclined part 52 form a rigidifying means for the intermediate portion 50. According to the embodiment of FIG. 1, the intersection 50a between the radial part 52 and the inclined part 54 of the intermediate portion 50 is set at the same diameter as the outer cylindrical surface 24b of the outer ring 24. As an alternate not shown, the intersection 50a is set at a lower diameter than the outer cylindrical surface 24b of the outer ring 24.

The outer axial tubular portion 56 axially extends from the inclined part 54, the portion 56 being radially above the outer cylindrical surface 24b of the outer ring 54 with respect to the central axis X10. Magnetized target 44 is fixed to an outer surface 56a of the outer axial tubular portion 56, beyond outer ring 24 radially to axis X1. Target 44 is a plastic molded part including magnetic poles, with an outer surface 46 facing detection means 6 held by external support (not shown). Detection means 6 may include Hall-effect sensors. Target 44 and detection means 6 cooperate for tracking the rotation of impulse ring 40, inner ring 22 and shaft 2 around central axis X10. As an alternate embodiment not shown, magnetized target is fixed to an inner surface of the outer axial tubular portion 56, beyond outer ring 24 radially to axis X10. In this case, detection means are arranged radially between the outer ring and the magnetized target, a lower surface of the magnetized target facing detection means.

The intermediate portion 50 further provides a plurality of stiffening ribs 58 which are circumferentially equally spaced around central axis X10. Ribs 58 protrude axially from the intermediate portion 50 towards the bearing 20. Ribs 58 radially elongate from the radial part 52 towards the inclined part 54 of the intermediate portion 50, in particular in the intersection 50a between the parts 52, 54. Advantageously, stiffening ribs 58 are manufacture for example by inwardly axially stamping the intermediate portion 50.

Figure 4:
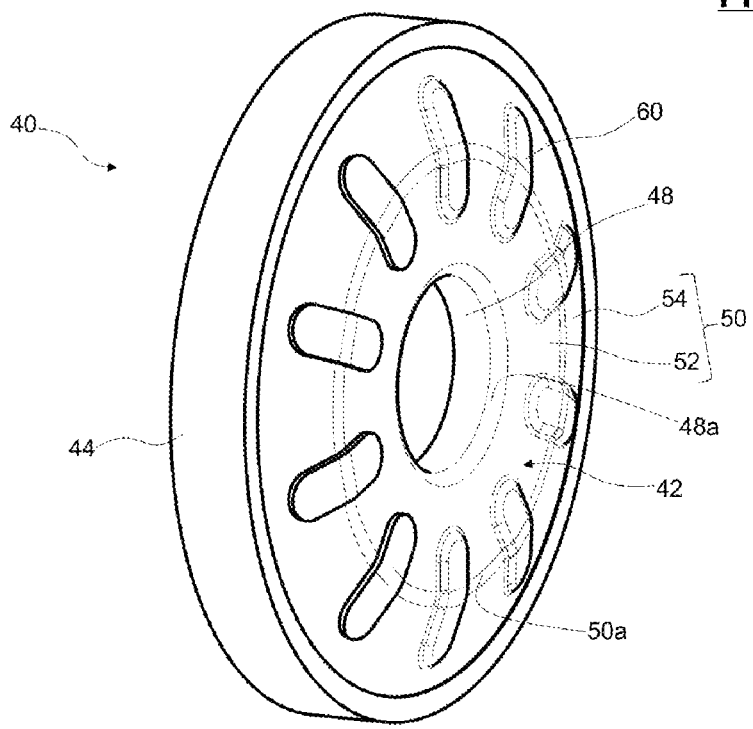
FIG. 4 is a perspective back view of an impulse ring according to a second embodiment of the invention.

According to a second embodiment of the invention illustrated in FIG. 4, wherein the same elements have the same reference numbers, the impulse ring 40 differs from the previous embodiment in that it provides a plurality of stiffening ribs 60 oriented towards the outside of the sensor-bearing unit 10.

Stiffening ribs 60 are circumferentially equally spaced around central axis X10. Ribs 60 protrude axially from the intermediate portion 50 towards an opposite direction to the bearing 20. Ribs 60 radially elongate from the radial part 52 towards the inclined part 54 of the intermediate portion 50, in particular in the intersection 50a between the parts 52, 54. Advantageously, stiffening ribs 60 are manufacture for example by outwardly axially stamping the intermediate portion 50.

The invention claimed is:

1. An impulse ring centered on a central axis, for a sensor-bearing unit including a bearing, the impulse ring comprising:
   a magnetized target that generates magnetic fields adapted to be sensed by detection means, and
   an annular target holder having an inner fixing portion adapted to be fixed to a rotatable inner ring of the bearing, an outer axial tubular portion centered on the central axis and holding the magnetized target is positioned radially beyond an outer ring of the bearing, and an intermediate portion that substantially radially extends between the inner fixing portion and outer axial tubular portion, wherein
   the intermediate portion includes:
   a radial part outwardly extending from the inner fixing portion along a radial surface that forms substantially a right angle with the central axis,
   an inclined part outwardly extending between the radial part and outer axial tubular portion along a frustoconical surface that is inclined with respect to the radial surface and is directed towards the outer ring of the bearing, and
   a plurality of circumferentially spaced stiffening ribs, the ribs protruding axially from the intermediate portion towards the bearing, the ribs being radially elongated from the radial part towards the inclined part of the intermediate portion, and the ribs being stamped inwardly axially from the intermediate portion,
   wherein the inner fixing portion is an inner axial tubular portion centered on the central axis, the radial part outwardly and perpendicularly extending from the inner axial tubular portion, the inner axial tubular portion being fitted in a bore of rotatable inner ring to fasten in rotation the impulse ring with the rotatable inner ring, the inner axial tubular portion comprising an axial edge being axially offset with respect to a lateral surface of the rotatable inner ring.

2. The impulse ring according to claim 1, wherein the ribs are circumferentially equally spaced around the central axis.

3. The impulse ring according to claim 1, wherein the inclined part along the frustoconical surface makes an angle with respect to the central axis of the impulse ring between 60° and 90°.

4. A sensor-bearing unit comprising:
   a bearing including a rotatable inner ring and a outer ring centered on a central axis, and
   an impulse ring having a magnetized target that generates magnetic fields adapted to be sensed by detection means, and an annular target holder having an inner fixing portion adapted to be fixed to the rotatable inner ring of the bearing, an outer axial tubular portion centered on the central axis and holding the magnetized target is positioned radially beyond the outer ring of the bearing, and an intermediate portion that substantially radially extends between the inner fixing portion and outer axial tubular portion, wherein the intermediate portion includes:
   a radial part outwardly extending from the inner fixing portion along a radial surface that forms substantially a right angle with the central axis,
   an inclined part outwardly extending between the radial part and outer axial tubular portion along a frustoconical surface that is inclined with respect to the radial surface and is directed towards the outer ring of the bearing, and
   a plurality of circumferentially spaced stiffening ribs, the ribs protruding axially from the intermediate portion towards the bearing, the ribs being radially elongated from the radial part towards the inclined part of the intermediate portion, and the ribs being stamped inwardly axially from the intermediate portion, and
   wherein the inner fixing portion is an inner axial tubular portion centered on the central axis, the radial part outwardly and perpendicularly extending from the inner axial tubular portion, the inner axial tubular portion being fitted in a bore of rotatable inner ring to fasten in rotation the impulse ring with the rotatable inner ring, the inner axial tubular portion comprising an axial edge being axially offset with respect to a lateral surface of the rotatable inner ring.

* * * * *